C. C. MILLAUDON.
Cigarette.
No. 212,392. Patented Feb. 18, 1879.
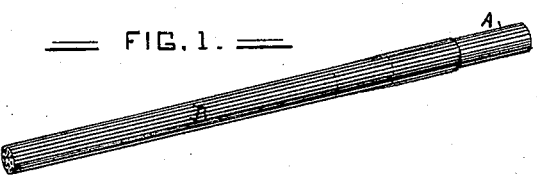
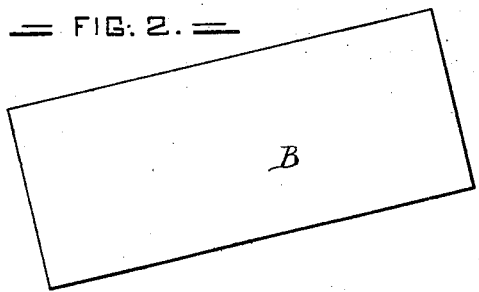

UNITED STATES PATENT OFFICE.

CLEMENTIN C. MILLAUDON, OF NEW ORLEANS, LOUISIANA.

IMPROVEMENT IN CIGARETTES.

Specification forming part of Letters Patent No. 212,392, dated February 18, 1879; application filed June 17, 1878.

*To all whom it may concern:*

Be it known that I, CLEMENTIN C. MILLAUDON, a resident of the city of New Orleans, parish of Orleans, and State of Louisiana, have invented a certain new and useful Improvement in the Manufacture of Cigarettes; and I do hereby declare the following to be a full, clear, and correct description of the same, reference being had to the annexed drawings, making a part of this specification.

This invention relates to that class of cigarettes which have their wrappers combined with mouth-pieces of cellular material; and the said invention consists in making said mouth-pieces of broom-straw, whereby a sweet and pleasant flavor is imparted to the cigarette not obtained from the holders made of rattan or bamboo, and other similar materials heretofore in use.

In order that my invention may be fully understood, attention is called to the accompanying drawings, whereon—

Figure 1 represents a perspective view of one of my improved cigarettes. Fig. 2 represents the wrapper, and Fig. 3 an enlarged cross-section of the mouth-piece.

The mouth-piece A is preferably made of broom-straw, as the said material, when fresh, will impart a sweet and pleasant flavor, while at the same time, owing to the spongy nature of its pith, it will absorb the nicotine, and hence prevent any deleterious effects from the same.

The wrapper B is made of paper, leaf-tobacco, or other suitable material, in which is inclosed the fine-cut fillings. The mouth-piece is cut about one inch in length, and is connected with the cigarette by being wrapped in one end thereof, or by simply gluing a narrow strip of paper or other material around the abutting ends of same.

Having described my invention, what I claim as new, and desire to secure by Letters Patent, is—

A cigarette provided with a mouth-piece of broom-straw, whereby a sweet and pleasant flavor is imparted thereto, substantially as set forth.

In testimony whereof I have hereunto signed my name.

C. C. MILLAUDON.

In presence of—
J. C. HUBBELL,
P. J. FINNEY.